US010757285B2

(12) United States Patent
Kimura et al.

(10) Patent No.: US 10,757,285 B2
(45) Date of Patent: Aug. 25, 2020

(54) DISPLAY SYSTEM HAVING PROCESSOR THAT EXECUTES FIRST PROCESS WHEN FIRST KEY IS OPERATED IN POWER SAVING STATE

(71) Applicant: SEIKO EPSON CORPORATION, Tokyo (JP)

(72) Inventors: Shohei Kimura, Nagano (JP); Masato Tsukioka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/283,890

(22) Filed: Feb. 25, 2019

(65) Prior Publication Data

US 2019/0268492 A1 Aug. 29, 2019

(30) Foreign Application Priority Data

Feb. 27, 2018 (JP) ................................ 2018-032911

(51) Int. Cl.
*H04N 1/00* (2006.01)
*G06F 3/12* (2006.01)
*G06F 1/3234* (2019.01)

(52) U.S. Cl.
CPC ....... *H04N 1/00904* (2013.01); *G06F 1/3284* (2013.01); *G06F 3/1221* (2013.01); *G06F 3/1229* (2013.01); *G06F 3/1284* (2013.01); *H04N 1/00129* (2013.01); *H04N 1/00384* (2013.01); *H04N 1/00411* (2013.01); *H04N 2201/0089* (2013.01); *H04N 2201/0094* (2013.01)

(58) Field of Classification Search
None
See application file for complete search history.

(56) References Cited

U.S. PATENT DOCUMENTS 7,302,195 B2 * 11/2007 Kobayashi ............ G06F 1/3203
399/8
8,334,992 B2 * 12/2012 Kitamura .............. H04N 1/0049
358/1.14
2009/0316178 A1 * 12/2009 Tanaka .................... G06F 21/81
358/1.14

FOREIGN PATENT DOCUMENTS

| JP | 2001-265294 A | 9/2001 |
| JP | 2005-242201 A | 9/2005 |
| JP | 2007-199773 A | 8/2007 |
| JP | 2010-004150 A | 1/2010 |

* cited by examiner

*Primary Examiner* — Paul F Payer
(74) *Attorney, Agent, or Firm* — Global IP Counselors, LLP

(57) ABSTRACT

There is provided a storage medium storing a printing control program that causes a processor controlling a printing apparatus which has a normal state, in which electric power is supplied to a display device, and a power saving state, in which the electric power is not supplied to the display device, to execute a process. The process includes causing a printing mechanism to execute a printing process in a state in which the electric power is not supplied to the display device when a first key that is a physical key is operated in the power saving state.

4 Claims, 6 Drawing Sheets

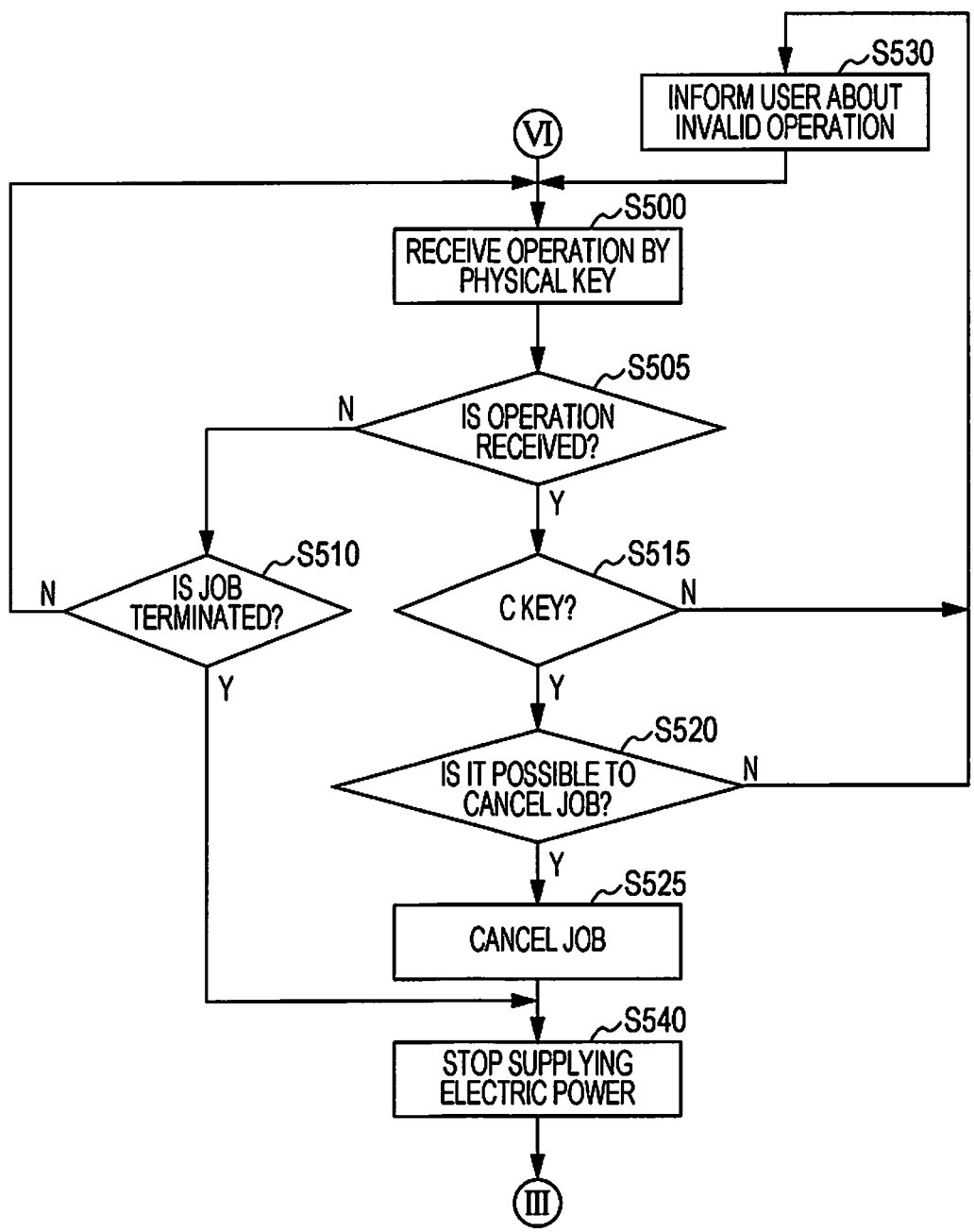

DISPLAY SYSTEM HAVING PROCESSOR THAT EXECUTES FIRST PROCESS WHEN FIRST KEY IS OPERATED IN POWER SAVING STATE

BACKGROUND

1. Technical Field

The present invention relates to a storage medium storing a printing control program and a display system.

2. Related Art

In the related art, in an electronic device such as a printer, a technology for reducing electric power consumption is known. For example, in JP-A-2010-4150, a technology for reducing unnecessary electric power consumption by controlling transition sequences of various modes is disclosed.

In the electronic device including a display device, it is preferable to reduce electric power consumption as much as possible, and reduction in the electric power consumption of the display device has become a problem.

SUMMARY

An advantage of some aspects of the invention is to reduce electric power consumption of a display device.

According to an aspect of the invention, there is provided a storage medium storing a printing control program that causes a processor controlling a printing apparatus which has a normal state, in which electric power is supplied to a display device, and a power saving state, in which the electric power is not supplied to the display device, to execute a process. The process includes causing a printing mechanism to execute a printing process in a state in which the electric power is not supplied to the display device, when a first key that is a physical key is operated in the power saving state. According to the configuration, a user can cause the printing mechanism to execute the printing process without shifting a state from the power saving state to the normal state by operating the first key. Therefore, the electric power consumption of the display device can be reduced.

According to another aspect of the invention, there is provided a display system having a normal state, in which electric power is supplied to a display device, and a power saving state, in which the electric power is not supplied to the display device, the system including a first key that is a physical key and a processor that causes a first processing mechanism to execute a first process in a state in which the electric power is not supplied to the display device, when the first key is operated in the power saving state. According to the configuration, a user can cause the first processing mechanism to execute the first process without shifting a state from the power saving state to the normal state by operating the first key. Therefore, the electric power consumption of the display device can be reduced.

In the display system, the processor may be configured not to cause the electric power to be supplied to the display device until the first process is terminated when the first key is operated in the power saving state. Further, the processor may be configured to cause a state of the display device to be set to the power saving state without causing the electric power to be supplied to the display device, when the first process is terminated. According to the configuration, the first process can be started and terminated in a state in which the electric power is not supplied to the display device.

In the display system, the electric power may be supplied to the first processing mechanism in the normal state and the electric power may not be supplied to the first processing mechanism in the power saving state. When the first key is operated in the power saving state, the processor may be configured to cause the electric power to be supplied to the first processing mechanism and cause the first processing mechanism to execute the first process. Further, the processor may be configured to cause the electric power not to be supplied in response to a completion of the first process. According to the configuration, since the electric power is not supplied when the electric power is not required in the first processing mechanism, the electric power for processing the first processing mechanism can be reduced.

In the display system, the processor may be configured to cause a second processing mechanism to execute a second process different from the first process when the first key is operated in the normal state. According to the configuration, it is possible to execute the function corresponding to each of an electric conduction state and the power saving state with the first key.

In the display system, a mark indicating the first process may be written in the first key. According to the configuration, the user can cause the first processing mechanism to execute the first process without visually recognizing the display device.

The display system may further include a second key that is a physical key, in which, when the second key is operated in the power saving state, the processor may be configured to cause the electric power to be supplied to the display device and cause a state of the display device to be set to the normal state. According to the configuration, it is possible to easily shift a state to the electric conduction state with the second key.

In the display system, the display device may be configured to be a touch panel, and the power saving state may be maintained even when a touch panel is touched in the power saving state. According to the configuration, it is possible to prevent the power saving state from being released by an unintentional touch on the touch panel.

In the display system, the electric power may not be supplied to a detection mechanism that detects a touch on the touch panel in the power saving state. According to the configuration, it is possible to easily prevent the power saving state from being released by an unintentional touch on the touch panel.

BRIEF DESCRIPTION OF THE DRAWINGS

The invention will be described with reference to the accompanying drawings, wherein like numbers reference like elements.

FIG. 7 is a flowchart showing an operation reception process.

DESCRIPTION OF EXEMPLARY EMBODIMENTS

Embodiments of the invention will be described in the following order.
(1) Configuration of Display System:
(2) Operation Reception Process:
(2-1) Default Selection Mode:
(2-2) Favorite Selection Mode:
(2-3) Input Mode for Number of Copies to be Printed:
(2-4) Cancel Reception Process:
(3) Operation Example:
(4) Other Embodiments:

(1) Configuration of Display System

Figure 1:
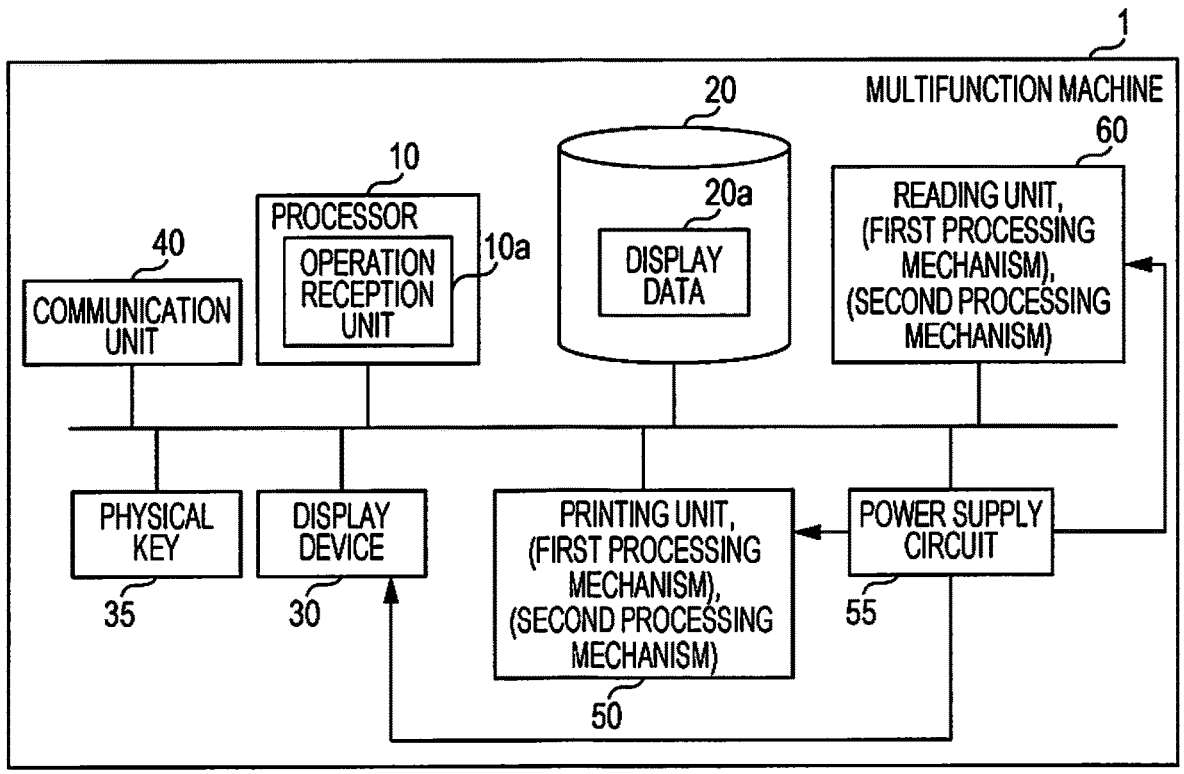
FIG. 1 is a block diagram showing a configuration of a multifunction machine.

FIG. 1 is a block diagram showing a configuration of a multifunction machine 1 including a display system according to an embodiment of the invention. The multifunction machine 1 includes a processor 10, a nonvolatile memory 20, a display device 30, physical keys 35, a communication unit 40, a printing unit 50, a power supply circuit 55, and a reading unit 60. The processor 10 includes a CPU, a ROM, a RAM, or the like (not shown), and can execute various programs recorded in the nonvolatile memory 20 to control each unit of the multifunction machine 1.

In the nonvolatile memory 20, programs executed by the processor 10 (not shown) and display data 20a are recorded. The display data 20a is data indicating images of objects (for example, an icon, a button, or the like) constituting a screen to be displayed on the display device 30. The processor 10 can cause the display device 30 to display the screen including various objects with reference to the display data 20a to form various user interfaces.

The display device 30 is a touch panel display, and includes a display panel and a touch panel superimposed on the display panel. The display device 30 displays various types of information on the display panel in accordance with a control of the processor 10. Further, the display device 30 includes a detection mechanism for detecting a contact (hereinafter referred to as a touch) with the touch panel by a finger of a user or a stylus or the like, and outputs a touch position to the processor 10. The processor 10 can acquire operation content of the user on the display device 30 based on the information acquired from the detection mechanism and can execute a process corresponding to the operation content.

In the present embodiment, the display panel is a liquid crystal display panel, and can display various images with a back light turned on in a state where electric power is supplied from a power supply circuit 55 to be described later and by a transmission amount of the liquid crystal being controlled for each pixel. Therefore, when the electric power is not supplied to the display device 30 and the electric power is not supplied to the display panel, display is not performed on the display device 30. Further, the detection mechanism can detect a touch on the touch panel in a state where the electric power is supplied from the power supply circuit 55 to be described later, and can output the touch position. Therefore, when the electric power is not supplied to the display device 30 and the electric power is not supplied to the detection mechanism, detection is not performed on the touch panel of the display device 30.

Figure 2:
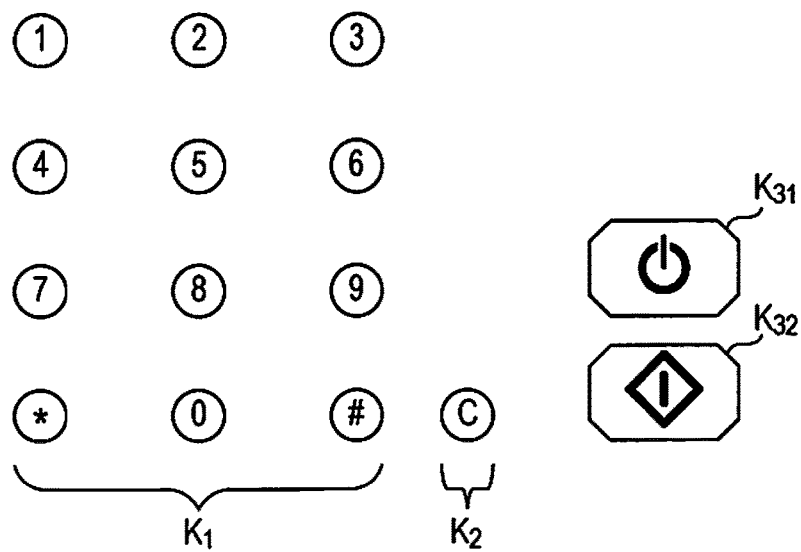
FIG. 2 is a diagram showing an example of physical keys.
Figure 3:
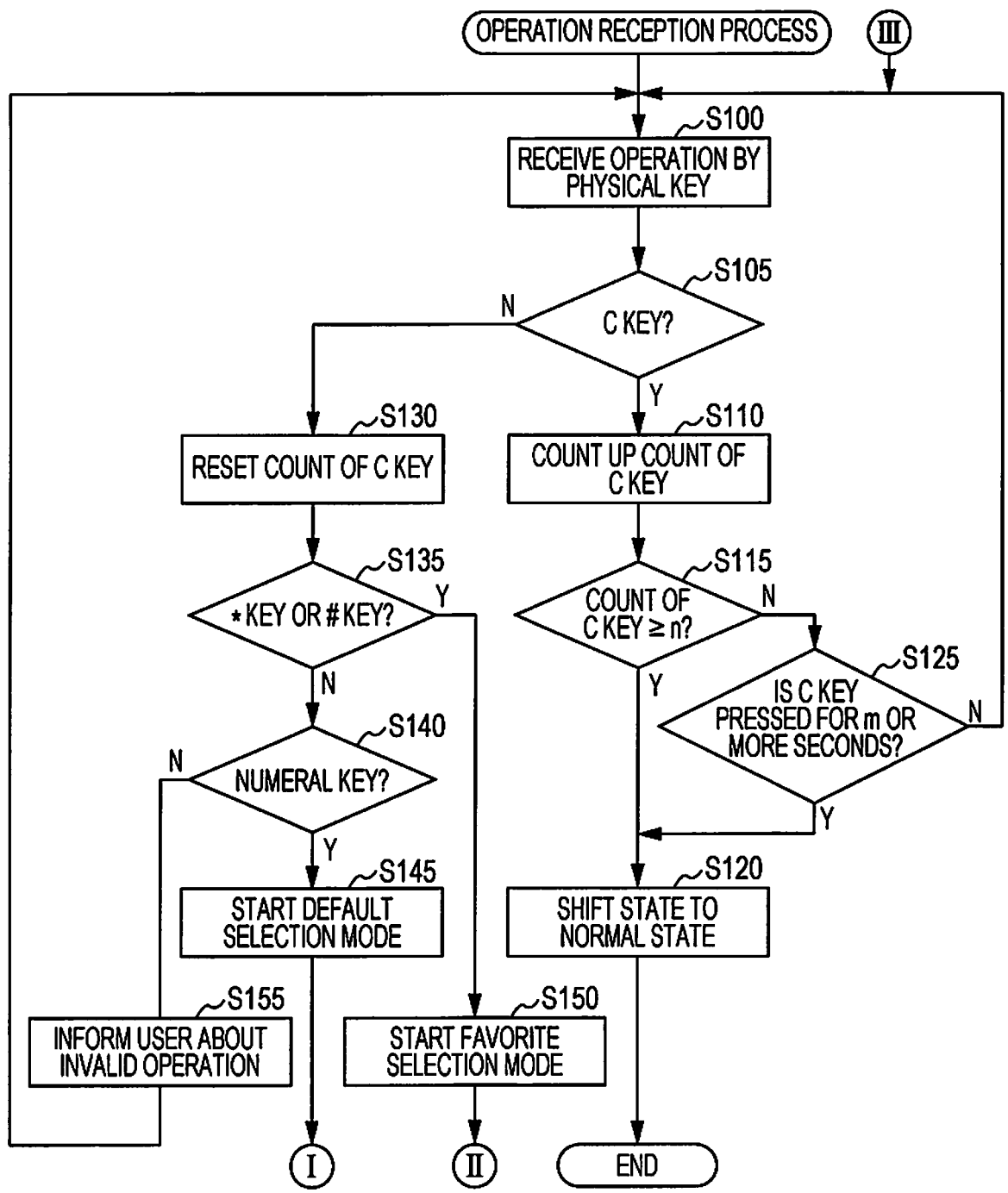
FIG. 3 is a flowchart showing an operation reception process.

The physical keys 35 are buttons provided in the multifunction machine 1, and the processor 10 can specify the physical key 35 operated by the user based on output signals of the physical key 35. In the present embodiment, the physical keys 35 include first keys, a second key, and third keys. FIG. 2 is a diagram showing an example of the physical keys 35. The first keys are keys for performing specifying a process to be executed, instructing an execution of each process, specifying parameters (the number of copies to be printed, or the like) in each process, or the like. In the present embodiment, the first keys are numeral keys of 0 to 9, a * key and a # key, and corresponding characters are written on the keys. In FIG. 2, the first keys are indicated by a reference symbol K1.

The second key is for canceling an operation by the first key, and releasing the power saving state, or the like. In the present embodiment, the second key is a C key in which C, which means clearing, is written, and in FIG. 2, the second key is indicated by a reference symbol K2. The third keys are physical keys that are not the first keys and the second key, and are keys to which dedicated functions are assigned in the present embodiment. In FIG. 2, a key K31 for turning on/off the electric power of the multifunction machine 1 and a key K32 for instructing a start of a process (start of printing or scanning or the like) are shown.

The communication unit 40 includes interface circuits for communicating with various removable memories attached to the multifunction machine 1 and equipment connected to the multifunction machine 1 in a wired or wireless manner. The processor 10 can acquire a file recorded in equipment connected via the communication unit 40 as a printing target.

The printing unit 50 includes an actuator, a sensor, a driving circuit, and a machine part for executing printing on various printing media using a well-known printing method such as an ink jet method or an electrophotographic method. The reading unit 60 includes a well-known color image sensor or a light source that emits light to a document mounted on a document table and receives reflected light from the document to obtain scan data, and includes an actuator, a driving circuit, a sensor, and a machine part for transporting the document. Note that, the printing unit 50 or the reading unit 60 may be provided with an ADF.

The power supply circuit 55 converts a frequency and a voltage of the electric power supplied from an external power source (not shown), and supplies the electric power to the display device 30, the printing unit 50, and the reading unit 60. For example, the power supply circuit 55 converts an AC voltage into a DC voltage suitable for each of the display panel and the detection mechanism of the display device 30, and supplies the corresponding DC voltage to the display panel and the detection mechanism. In addition, the power supply circuit 55 also generates a voltage suitable for each unit of the printing unit 50 and the reading unit 60, and supplies the corresponding voltage to the printing unit 50 and the reading unit 60. In FIG. 1, electric power supply destinations from the power supply circuit 55 are indicated with arrows.

In the present embodiment, the power supply circuit 55 is connected to the processor 10 via an interface (not shown), and an operation of the power supply circuit 55 is controlled by the processor 10. That is, the power supply circuit 55 can select whether to perform the electric power conversion based on the control signals output from the processor 10. Further, the power supply circuit 55 can select a target of the electric power supply based on the control signals output from the processor 10. Therefore, the power supply circuit 55 can select a target of the electric power supply according to an instruction of the processor 10, and in a case where it is not necessary to supply the electric power by a specific voltage, it is possible not to perform the electric power conversion for generating the voltage.

Various programs executed by the processor 10 include a power control program, an operation reception program, and a display control program. The power control program causes the processor 10 to function as an electric power control unit. The processor 10 can control the operation in the power supply circuit 55 by the function of the electric power control unit. In the present embodiment, the power supply circuit 55 operates in plural types of states. That is, a normal state is set immediately after an activation of the multifunction machine 1, and when a certain period of time elapses without any operation on the physical key 35, a power saving state is set. In addition, when a predetermined operation is performed with the physical key 35 in the power saving state, the processor 10 switches the power saving state to the normal state. Furthermore, when a predetermined instruction is performed with the first key of the physical key 35 in the power saving state, the processor 10 supplies the electric power to at least one of the printing unit 50 and the reading unit 60 enable at least one of the printing unit 50 and the reading unit 60 to perform the process while stopping the electric power supply to the display device 30.

The normal state is a state in which the electric power is supplied to the processor 10, the nonvolatile memory 20, the display device 30, the physical keys 35, the communication unit 40, the printing unit 50, and the reading unit 60. In the normal state, the processor 10 outputs the control signals to the power supply circuit 55 to perform the electric power conversion and causes the power supply circuit 55 to output the electric power required by the display device 30, the printing unit 50, and the reading unit 60. In the power saving state, the electric power is not supplied to the display device 30 at the least, so that the electric power consumption is lower than that in the normal state. Normally, the power saving state is a state where the electric power is not supplied to the display device 30, the printing unit 50, and the reading unit 60, and a state where the electric power is supplied to the processor 10, the nonvolatile memory 20, the physical keys 35, and the communication unit 40. In the power saving state, the processor 10 does not cause the power supply circuit 55 to perform the electric power conversion for supplying the electric power to the display device 30, the printing unit 50, and the reading unit 60 by outputting the control signals to the power supply circuit 55. Thus, the electric power is not supplied to any of the display device 30, the printing unit 50, and the reading unit 60. In the power saving state in the present embodiment, the multifunction machine 1 waits for an operation to be performed with the physical key 35 as described later, or waits for a printing job to come which instructs printing from an external device via the communication unit 40, or waits for a reading job to come which instructs an image reading. Instructions may be processed by the processor 10 while the power saving state is maintained in some cases such as when an instruction has come from the external device to notify a state of the multifunction machine 1 via the communication unit 40.

The operation reception program is executed in the power saving state, and causes the processor 10 to function as the operation reception unit 10a. When the user operates the first key and the second key of the physical key 35 in the power saving state, the processor 10 specifies the operated key by the function of the operation reception unit 10a and performs a process corresponding to the operated key. That is, even in a state in which various images are not displayed on the display device 30 due to the power saving state, the user can execute various processes.

In the power saving state in the present embodiment, it is possible to perform a printing process using the printing unit 50, a scanning process using the reading unit 60, and a copying process using the reading unit 60 and the printing unit 50 by operating the first key. Further, it is also possible to cancel the operation with the first key or release the power saving state by operating the second key. Various processes executed by the multifunction machine 1 may be the first process, however, in here, a first process will be described with focus on a copying process in which a read result is printed by the printing unit 50 after a document is read by the reading unit 60. Further, in the power saving state, the printing unit 50 and the reading unit 60, which execute the first process, function as a first processing mechanism. In addition, the printing unit 50 that executes the printing process in the power saving state functions as a printing mechanism. If the copying process is regarded as one type of the printing process, the printing unit 50 and the reading unit 60 can also be regarded as the printing mechanism.

In the power saving state, the electric power is not supplied to the display device 30, the printing unit 50, and the reading unit 60 from the power supply circuit 55, however, the electric power is supplied to the printing unit 50 and the reading unit 60 when the operation of the first key is performed and the copying process as the first process is executed. That is, when the first key operation is performed, the processor 10 outputs the control signals to the power supply circuit 55 before the copying process as the first process is executed, and causes the power supply circuit 55 to supply the electric power to the first processing mechanism (the printing unit 50 and the reading unit 60 in a case of the copying process) necessary for the first process. Then, in this state, the processor 10 executes the copying by controlling the reading unit 60 to generate image data, to generate printing data for printing the image data, and to transfer the data to the printing unit 50.

Upon completion of the copying process by the printing unit 50 and the reading unit 60, the processor 10 outputs the control signals to the power supply circuit 55 to stop supplying the electric power to the printing unit 50 and the reading unit 60. Therefore, in the present embodiment, the processor 10 starts supplying the electric power to the printing unit 50 and the reading unit 60 as the first processing mechanism when the first key is operated in the power saving state, and causes the printing unit 50 and the reading unit 60 to execute the first process. Further, the processor 10 stops supplying the electric power in response to the termination of the first process. According to the configuration, since the electric power is not supplied to the first processing mechanism when the electric power is not required, the electric power for processing the first processing mechanism can be reduced.

On the other hand, the electric power is not supplied to the display device 30 when the first key is operated and the copying process is performed as the first process. That is, the processor 10 does not output the control signals for supplying the electric power to the display device 30, to the power supply circuit 55. As a result, in the present embodiment, the processor 10 causes the printing unit 50 and the reading unit 60, which are the first processing mechanism, to execute the first process in a state where the electric power is not supplied to the display device 30 when the first key is operated in the power saving state. Accordingly, the user can cause the first processing mechanism to execute the first process by operating the first key without shifting a state from the power saving state to the normal state. Therefore, the electric power consumption of the display device 30 can be reduced.

In the present embodiment, when the first key is operated in the power saving state, the electric power is not supplied to the display device 30 until the first process is terminated, and when the first process is terminated, the power saving state is set without supplying the electric power to the display device 30. According to the configuration, the first process can be started and terminated without supplying the electric power to the display device 30.

The processor 10 starts supplying the electric power to the display device 30 and sets a state to the normal state when the second key is operated in the power saving state. In the present embodiment, it is configured to shift a state to the normal state by a special operation with the second key (operation not appearing in the execution of the first process). The special operation may be various operations. In the embodiment, an operation of continuously pressing the C key, which is the second key, n times (n is an integer of one or more: for example, three) or an operation of continuously pressing the C key for m or more seconds (for example, three seconds) is defined as the special operation.

When the special operation is performed by the user using the second key, the processor 10 controls the power supply circuit 55 to shift a state to the normal state where the electric power is supplied to the display device 30, the printing unit 50, and the reading unit 60. According to the above configuration, it is possible to realize a configuration in which a state is easily shifted to an electric conduction state by the second key while configuring so as not to unintentionally shift a state to the normal state by the operation with the first key. An operation (for example, special operation with the second key) for shifting a state from the normal state to the power saving state may be set.

In the present embodiment, the power saving state is maintained even when the touch panel of the display device 30 is touched in the power saving state. That is, since the electric power is not supplied to a detection mechanism of the display device 30 in the power saving state, even if a touch operation is performed on the touch panel of the display device 30, the touch operation is not detected. Accordingly, in the power saving state, the processor 10 can neither acquire operation content for the touch panel from the display device 30, nor release the power saving state by operating the touch panel. Therefore, there is no possibility that the user unintentionally releases the power saving state and shifts a state to the normal state by an operation such as unintentional touching by the user with the touch panel of the display device 30.

On the other hand, the display control program is executed in the normal state, and causes the processor 10 to function as a display control unit. The processor 10 causes the display device 30 to display various objects by a function of the display control unit to receive an operation for the displayed objects. In other words, the processor 10 causes the display device 30 to display the objects indicated by the display data 20a at a predetermined position by the function of the display control unit, and causes the objects to function as soft keys. Therefore, in the normal state, the user can perform an instruction for the multifunction machine 1 easily performing the desired process by performing various operations on the touch panel according to the various contents displayed on the display panel of the display device 30.

Note that, the physical keys 35 can also be used in the normal state. In the present embodiment, a second process different from the first process is assigned to the first key in the normal state. That is, the processor 10 causes the printing unit 50 and the reading unit 60, or one of the printing unit 50 and the reading unit 60, to execute the second process different from the first process when the first key is operated in the normal state. Therefore, in the present embodiment, the printing unit 50 and the reading unit 60 also function as a second processing mechanism.

In the present embodiment, the processor 10 can execute a second process different type from the first process. The second process different type from the first process may be various processes. For example, a process, which causes the display panel of the display device 30 to display a file list recorded in a removable memory attached to the multifunction machine 1 to receive a selection of the file, may be executable as the second process. Further, the second process may be a configuration that cannot be executed as the first process.

Furthermore, the same type of process as the first process may be executed as the second process (for example, a monochrome copying process is included in both of the first process and the second process, or the like). However, in a case where the same type of process is included in the first process and the second process, an operation with the first key to be performed for activating the same type of process is different between the power saving state and the normal state. That is, in order to activate the same type of process, the operation performed by the first key in the power saving state is different from the operation performed by the first key in the normal state. For example, a configuration can be adopted in which a copying process is executed by pressing the # key after selecting a function with the numeral key in the power saving state, a configuration in which a copying process is executed by pressing the soft key after selecting a function with the numeral key in the normal state, or the like. Either way, according to the above configuration, it is possible to execute the function corresponding to each of the electric conduction state and the power saving state, with the first key.

(2) Operation Reception Process

Next, an operation reception process executed by the processor 10 of the multifunction machine 1 shown in FIG. 1, by a function of an operation reception unit 10a, will be described. FIGS. 3 to 7 are flowcharts showing the operation reception process. When the power saving state is started, the processor 10 starts the operation reception process. In the operation reception process, the processor 10 monitors output signals of the physical key 35 and receives an operation by the physical key 35 (step S100). When the operation of the physical key 35 is received in step S100, the processor 10 determines whether or not the operated key is the C key (step S105).

In step S105, if it is determined that the operated key is the C key, the processor 10 counts up a count of the C key (step S110). That is, in the present embodiment, a count variable for counting the number of times the C key is pressed is prepared in advance, and an initial value is set to 0. When step S110 is executed, the processor 10 increases the count variable.

Next, the processor 10 determines whether or not the count of the C key is greater than or equal to a threshold value n (step S115). If it is determined that the count of the C key is greater than or equal to the threshold value n, the processor 10 shifts a state to the normal state (step S120). That is, the processor 10 outputs the control signals to the power supply circuit 55 to start an operation and to start supplying the electric power to the display device 30, the printing unit 50, and the reading unit 60.

On the other hand, in step S115, if it is not determined that the count of the C key is greater than or equal to the threshold value n, the processor 10 determines whether or not the C key is pressed for m or more seconds (step S125). That is, in the present embodiment, a time measurement variable for measuring a time during which the C key is being continuously pressed is prepared in advance, and an initial value is set to 0. The processor 10 starts measuring the time when the C key is pressed, and stops measuring the time and records the time in the time measurement variable when the C key is not pressed. The processor 10 waits until a value other than 0 is recorded in the time measurement variable, and when the recorded value is a value greater than or equal to m, the processor 10 determines that the C key is pressed for m or more seconds.

In step S125, if it is not determined that the C key is pressed for m or more seconds, the processor 10 repeats the process after step S100. In this case, the count variable for counting the number of times the C key is pressed is not reset, however, the time measurement variable for measuring the time during which the C key is being continuously pressed is reset. In step S125, if it is determined that the C key is pressed for m or more seconds, the processor 10 shifts a state to the normal state by step S120. That is, in step S115 or S125, if it is determined that the special operation is performed with the C key which is the second key, a state is shifted from the power saving state to the electric conduction state.

In step S105, if it is not determined that the operated key is the C key, the processor 10 resets the count of the C key (step S130). That is, in this case, it is regarded that the operation of continuously pressing the C key is not performed, and the processor 10 resets the count of the C key. Next, the processor 10 determines whether or not the operated key is an * key or a # key (step S135). In step S135, if it is not determined that the operated key is the * key or the # key, the processor 10 determines whether or not the operated key is a numeral key (step S140).

That is, in the present embodiment, functions are assigned in advance to numeral keys, the * key, and the # key which are the first keys. As shown in FIG. 2, numerals, *, and # are written on surfaces of the first keys, and the user can select a desired process by using marks written on the first keys and perform the instruction to be executed. That is, in the present embodiment, plural first processes are prepared in advance, and the user can select which process is to be executed by using the marks written on the first keys.

In the present embodiment, a mode can be selected by the first key pressed at the first. That is, in the present embodiment, a default selection mode and a favorite selection mode are prepared in advance. The default selection mode is a mode in which predetermined first processes are assigned to numeral keys, and the user can select a desired first process by selecting the numerals. The default selection mode can be used as a mode for selecting a process estimated to be used by many users, for example, a configuration in which a monochrome copy is assigned to a numeral 1, color copy is assigned to a numeral 2, or the like are assumed.

The favorite selection mode is a mode in which the user preliminarily assigns a desired first process to the numeral keys. The assignment of the first process to the numeral keys can be performed, for example, by the user performing work in advance using the user interface displayed on the display device 30. The favorite selection mode can be used as a mode for selecting a process with user specific settings, for example, a configuration, in which a color copy set with parameters such as high quality copy and high quality printing media is assigned to a numeral 1, and a copy set with parameters of a predetermined number of copies to be printed is assigned to a numeral 2, is assumed.

In the embodiment, it is regarded that the favorite selection mode is selected when the first key pressed at the first is the * key or the # key. Also, it is regarded that the default selection mode is selected when the first key pressed at the first is the numeral key. That is, in step S135, if it is determined that the operated key is the * key or the # key, the processor 10 starts the favorite selection mode (step S150). In step S140, if it is determined that the operated key is the numeral key, the processor 10 starts the default selection mode (step S145).

Note that, in step S140, if it is not determined that the operated key is the numeral key, the processor 10 informs the user about an invalid operation (step S155). That is, in step S140, if it is not determined that the operated key is the numeral key, for example, then it is a case where the third key is pressed, and it is an invalid operation in the power saving state. The processor 10 informs the user of the invalid operation, for example, by outputting a predetermined sound from a speaker (not shown).

Figure 4:
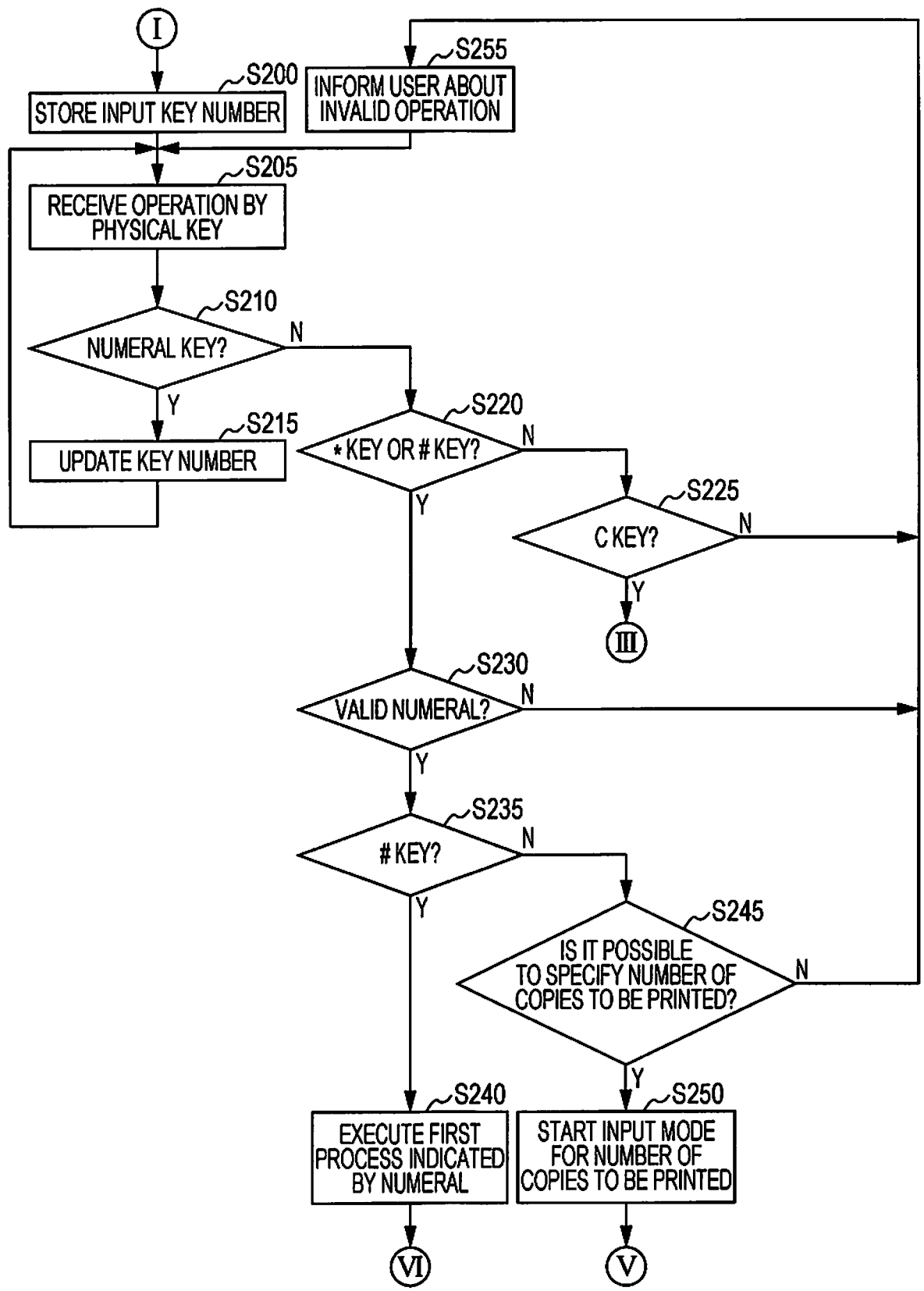
FIG. 4 is a flowchart showing an operation reception process.

(2-1) Default Selection Mode:

Next, a process of the default selection mode will be described. FIG. 4 is a flowchart showing a process in the default selection mode. When the default selection mode is started, the processor 10 stores an input key number (step S200). That is, in the default selection mode, a default processing specification variable that stores one digit key number for specifying a process set as default is prepared in advance, and the processor 10 replaces the key number of the operated numeral key to the default processing specification variable.

Next, the processor 10 monitors the output signals of the physical key 35 and receives the operation by the physical key 35 (step S205). When the operation of the physical key 35 is received in step S205, the processor 10 determines whether or not the operated key is the numeral key (step S210).

In step S210, if it is determined that the operated key is the numeral key, the processor 10 updates the key number (step S215). That is, the processor 10 overwrites the default processing specification variable with the key number indicated by the numeral key received in step S205. When completing step S215, the processor 10 repeats the process after step S205. As described above, as for the default selection mode in the present embodiment, it is configured to receive one digit numeral with the numeral key, however, it may be configured to receive two or more digit numerals.

In step S210, if it is not determined that the operated key is the numeral key, the processor 10 determines whether or not the operated key is the * key or the # key (step S220). In step S220, if it is not determined that the operated key is the * key or the # key, the processor 10 determines whether or not the operated key is the C key (step S225).

In step S225, if it is determined that the operated key is the C key, the processor 10 assumes that the user canceled the operation and repeats the process after step S100. That is, the processor 10 assumes that the operation of the first key in the power saving state is restarted from the beginning. In step S225, if it is not determined that the operated key is the C key, the processor 10 informs the user about the invalid operation (step S255). The inform process is the same process as in step S155.

On the other hand, in step S220, if it is determined that the operated key is the * key or the # key, the processor 10 refers to the default processing specification variable and determines whether or not it is a valid numeral (step S230). In the present embodiment, the first processes are assigned to some of the numerals from 0 to 9 (for example, 1 to 3) by default. When the numeral to which the first process is assigned, is recorded in the default processing specification variable, the processor 10 determines that it is a valid numeral. That is, when the first process is assigned to the key number of the last input numeral key, the processor 10 determines that it is a valid numeral.

In step S230, if it is determined that the numeral is valid, the processor 10 determines whether or not the operated key is the # key (step S235). In the present embodiment, when the # key which is the first key is pressed after the valid numeral, execution of the selected first process is instructed. In addition, when the * key which is the first key is pressed after the valid numeral, specification of number of copies to be printed for the selected first process is instructed.

In step S235, if it is determined that the operated key is the # key, the processor 10 executes the first process indicated by the numeral (step S240). For example, when the selected first process is a copying process, the processor 10 outputs the control signals to the power supply circuit 55 to supply the electric power to the printing unit 50 and the reading unit 60. In addition, the processor 10 does not supply the electric power to the display device 30. Then, in this state, the processor 10 controls the reading unit 60 to generate image data, to generate printing data for printing the image data, and to transfer the data to the printing unit 50. As a result, a copy of the document mounted on a document table is performed.

On the other hand, in step S235, if it is not determined that the operated key is the # key, that is, if the operated key is the * key, the processor 10 determines whether or not it is possible to specify the number of copies to be printed (step S245). That is, the processor 10 specifies the first process assigned to the numeral recorded in the default processing specification variable. In a case where the first process is a process capable of setting the number of copies to be printed, the processor 10 determines that it is possible to specify the number of copies to be printed. The case where the number of copies to be printed cannot be specified is, for example, a case where the first process is a process for performing maintenance of the printing unit 50 or the reading unit 60.

In step S245, if it is determined that the number of copies to be printed can be specified, the processor 10 starts an input mode for a number of copies to be printed (step S250). That is, an input of a number of copies to be printed is received by the subsequent process. In step S245, if it is not determined that the number of copies to be printed can be specified, or in step S230, it is not determined that the numeral is valid, the processor 10 informs the user about the invalid operation in step S255.

Figure 5:
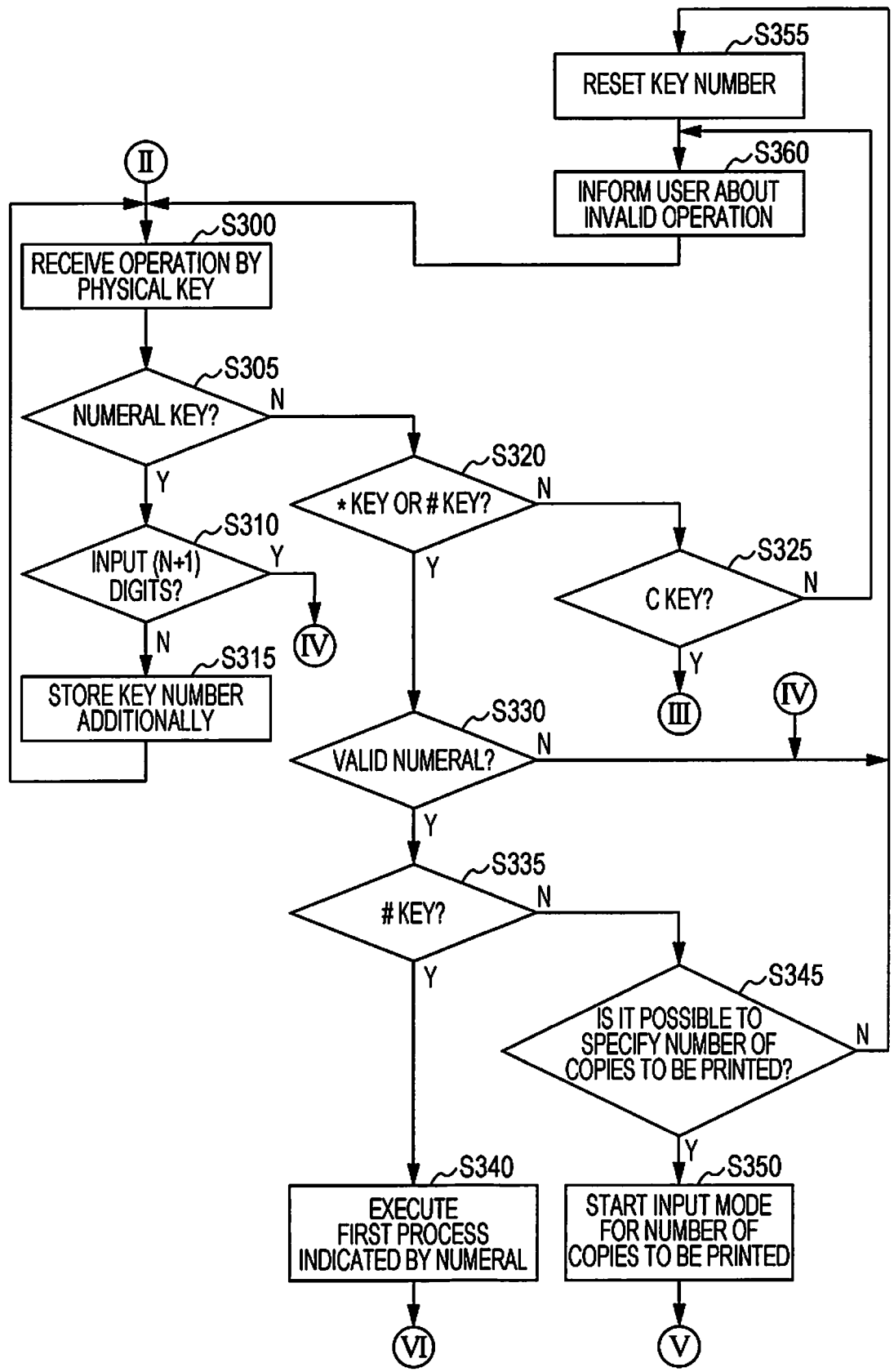
FIG. 5 is a flowchart showing an operation reception process.

(2-2) Favorite Selection Mode:

Next, a process of the favorite selection mode will be described. FIG. 5 is a flowchart showing a process in the favorite selection mode. When the favorite selection mode is started, the processor 10 monitors the output signals of the physical keys 35 and receives an operation by the physical keys 35 (step S300). When the operation of the physical key 35 is received in step S300, the processor 10 determines whether or not the operated key is the numeral key (step S305).

In step S305, if it is determined that the operated key is the numeral key, the processor 10 determines whether or not the input numeral is (N+1) digits (step S310). That is, in the favorite selection mode, a favorite processing specification variable that stores a number for specifying a process set as a favorite is prepared in advance. In the present embodiment, N digit (for example, two digits) is preset as an upper limit digit. The processor 10 refers to the favorite processing specification variable, and if a value indicated by the favorite processing specification variable is (N+1) digits, the processor 10 determines that more digits are input than the N digit, which is the upper limit digit.

In step S310, if it is not determined that the input numeral is (N+1) digits, the processor 10 additionally stores the key number (step S315). That is, the processor 10 multiplies a value recorded in the favorite processing specification variable by 10, and replaces the value, in which the key number of the operated numeral key is set to be the first digit of the value, to the favorite processing specification variable. Thereafter, the processor 10 repeats the process after step S300. As described above, as for the favorite selection mode in the present embodiment, it is configured to receive numerals of N digit at the maximum with the numeral keys, and N may be various values. In step S310, if it is determined that the input numeral is (N+1) digits, the processor 10 informs the user about the invalid operation (step S360). The inform process is the same process as in step S155.

In step S305, if it is not determined that the operated key is the numeral key, the processor 10 determines whether or not the operated key is the * key or the # key (step S320). In step S320, if it is not determined that the operated key is the * key or the # key, the processor 10 determines whether or not the operated key is the C key (step S325).

In step S325, if it is determined that the operated key is the C key, the processor 10 assumes that the user canceled the operation and repeats the process after step S100. That is, the processor 10 assumes that the operation of the first key in the power saving state is restarted from the beginning. In step S325, if it is not determined that the operated key is the C key, the processor 10 informs the user about the invalid operation (step S360).

On the other hand, in step S320, if it is determined that the operated key is the * key or the # key, the processor 10 refers to the favorite processing specification variable and determines whether or not it is a valid numeral (step S330). In the present embodiment, when the user preliminarily assigns a desired first process as a favorite process, the first process is assigned to at least one (for example, 1 or 11, or the like) of N digit. When the numeral to which the first process is assigned is recorded in the favorite processing specification variable, the processor 10 determines that it is a valid numeral. That is, when the first process is assigned to a numeral string indicated by the input numeral key, the processor 10 determines that it is a valid numeral.

In step S330, if it is determined that the numeral is valid, the processor 10 determines whether or not the operated key is the # key (step S335). In the present embodiment, if the # key which is the first key is pressed after the valid numeral, execution of the selected first process is instructed. In addition, if the * key which is the first key is pressed after the valid numeral, specification of the number of copies to be printed in the selected first process is instructed.

In step S335, if it is determined that the operated key is the # key, the processor 10 executes the first process indicated by the numeral (step S340). For example, when the selected first process is a copying process, the processor 10 outputs the control signals to the power supply circuit 55 to supply the electric power to the printing unit 50 and the reading unit 60. In addition, the processor 10 does not supply the electric power to the display device 30. Then, in this state, the processor 10 controls the reading unit 60 to generate image data, to generate printing data for printing the image data, and to transfer the data to the printing unit 50. As a result, a copy of the document mounted on the document table is performed.

On the other hand, in step S335, if it is not determined that the operated key is the # key, that is, if the operated key is the * key, the processor 10 determines whether or not it is possible to specify a number of copies to be printed (step S345). The process of step S345 is same as the process of step S245.

In step S345, if it is determined that the number of copies to be printed can be specified, the processor 10 starts an input mode for a number of copies to be printed (step S350). That is, an input of the number of copies to be printed is received by the subsequent process. In step S345, if it is not determined that the number of copies to be printed can be specified, or in step S330, it is not determined that the numeral is a valid number, the processor 10 resets the key number (step S355). That is, the favorite processing specification variable is initialized to 0. Thereafter, the processor 10 executes the process after step S360.

Figure 6:
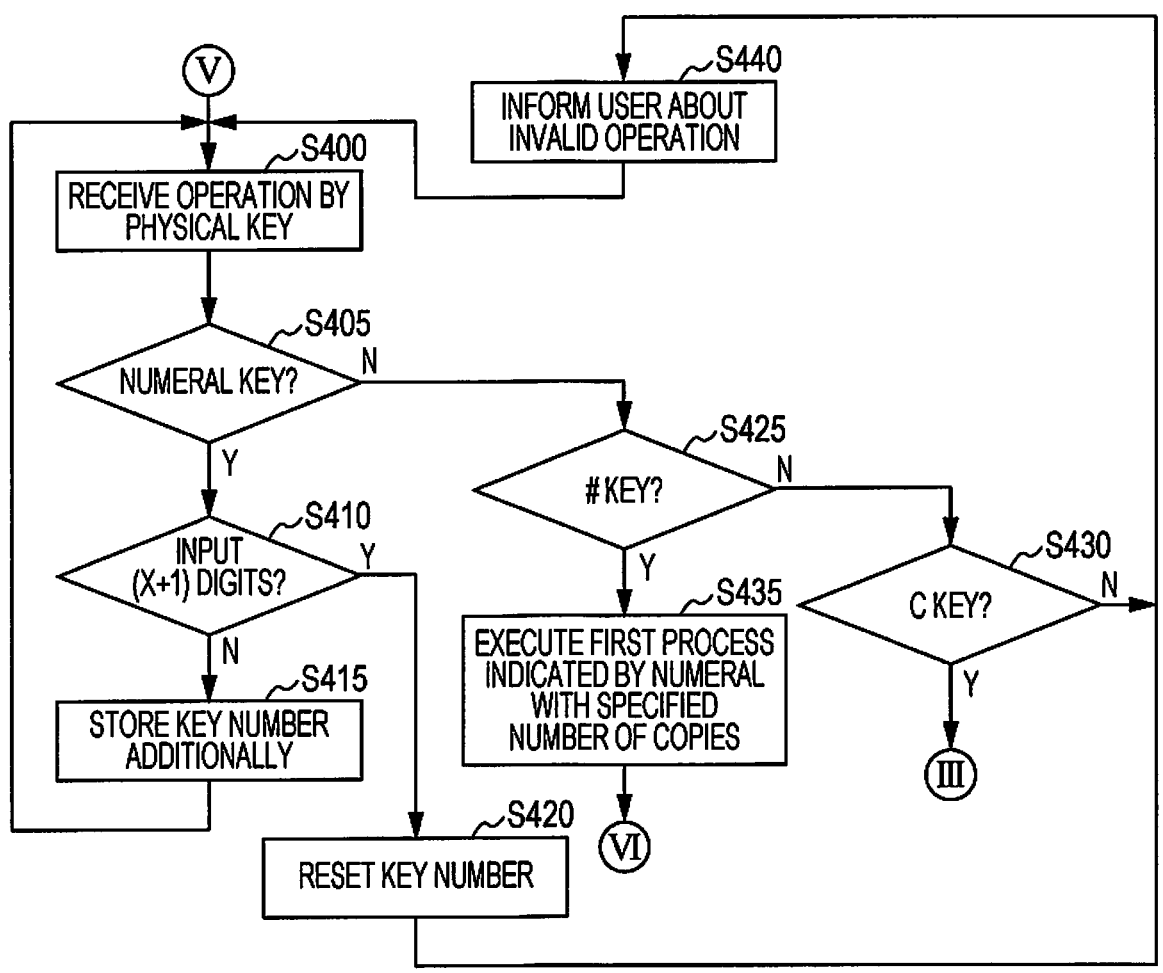
FIG. 6 is a flowchart showing an operation reception process.

(2-3) Input Mode for Number of Copies to be Printed:

Next, a process of the input mode for a number of copies to be printed will be described. FIG. 6 is a flowchart showing a process of the input mode for a number of copies to be printed. When the input mode for a number of copies to be printed is started, the processor 10 monitors the output signals of the physical keys 35 and receives the operation by the physical keys 35 (step S400). When the operation of the physical key 35 is received in step S400, the processor 10 determines whether or not the operated key is the numeral key (step S405).

In step S405, if it is determined that the operated key is the numeral key, the processor 10 determines whether or not the input numeral is (X+1) digits (step S410). That is, in the input mode for a number of copies to be printed, a number of copies variable that stores the number of input copies is prepared in advance. In the present embodiment, X digit (for example, two digits) is preset as an upper limit digit. The processor 10 refers to the number of copies variable, and if a value indicated by the number of copies variable is (X+1) digits, the processor 10 determines that more digits are input than the X digit, which is the upper limit digit.

In step S410, if it is not determined that the input numeral is (X+1) digits, the processor 10 additionally stores the key number (step S415). That is, the processor 10 multiplies a value recorded in the number of copies variable by 10, and replaces the value, in which the key number of the operated numeral key is set to be the first digit of the value, to the number of copies variable. Thereafter, the processor 10 repeats the process after step S400. As described above, as for the input mode for a number of copies to be printed in the present embodiment, it is configured to receive the numeral of X digit at the maximum with numeral keys, and X may be various values.

In step S410, if it is determined that the input numeral is (X+1) digits, the processor 10 resets the key number (step S420). That is, the processor 10 initializes the number of copies variable to 0. Next, the processor 10 informs the user about the invalid operation (step S440). The inform process is the same process as in step S155. The processor 10 repeats the process after step S400.

In step S405, if it is not determined that the operated key is the numeral key, the processor 10 determines whether or not the operated key is the # key (step S425). In step S425, if it is not determined that the operated key is the # key, the processor 10 determines whether or not the operated key is the C key (step S430).

In step S430, if it is determined that the operated key is the C key, the processor 10 assumes that the user canceled the operation and repeats the process after step S100. That is, the processor 10 assumes that the operation of the first key in the power saving state is restarted from the beginning. In step S430, if it is not determined that the operated key is the C key (for example, when the * key is pressed), the processor 10 informs the user about the invalid operation (step S440).

On the other hand, in step S425, if it is determined that the operated key is the # key, the processor 10 executes the first process indicated by the numeral with the specified number of copies (step S435). For example, when the selected first process is the copying process, the processor 10 outputs the control signals to the power supply circuit 55 to supply the electric power to the printing unit 50 and the reading unit 60. In addition, the processor 10 does not supply the electric power to the display device 30. Then, in this state, the processor 10 controls the reading unit 60 to generate image data, to generate printing data for printing the image data, and to transfer the data to the printing unit 50. Further, the processor 10 controls the printing unit 50 to repeat printing by the value indicated by the number of copies variable. As a result, copies of the document mounted on the document table can be obtained by the number of input copies.

(2-4) Cancel Reception Process:

FIG. 7 shows a process executed after steps S240, S340, and S435 are executed. In the present embodiment, cancellation of a job executed as the first process can be received in the process. Specifically, the processor 10 monitors the output signals of the physical keys 35 and performs a process of receiving an operation by the physical keys 35 (step S500), and determines whether or not an operation by the user is received (step S505).

In step S505, if it is not determined that the operation by the user is received, the processor 10 determines whether or not the job executed as the first process is terminated (step S510). If it is not determined that the job is terminated, the processor 10 repeats the process after step S500. In step S510, if it is determined that the job is terminated, the processor 10 stops supplying the electric power (step S540). That is, the processor 10 controls the power supply circuit 55 to stop supplying the electric power to the printing unit 50, and the reading unit 60. As a result, the multifunction machine 1 is put into the power saving state again. Thereafter, the processor 10 repeats the process after step S100. That is, the processor 10 assumes that the operation of the first key in the power saving state is restarted from the beginning.

On the other hand, in step S505, if it is determined that an operation by the user is received, the processor 10 determines whether or not the operated key is the C key (step S515). In step S515, if it is not determined that the operated key is the C key, the processor 10 informs the user about the invalid operation (step S530). The inform process is the same process as in step S155.

In step S515, if it is determined that the operated key is the C key, the processor 10 assumes that the cancellation of the job is instructed by the user and determines whether or not the job being executed can be canceled (step S520). That is, there are jobs that can be canceled and jobs that cannot be canceled in the first process. Even a job that can be canceled has both a timing at which it can be canceled and a timing at which it cannot be canceled.

For example, a cleaning process of an ink discharge nozzle included in the printing unit 50 cannot be canceled after the start. Also, in the printing process, a process cannot be canceled when the printing data is transferred to the printing unit 50 and the printing is started, however, the process can be canceled before the printing data is transferred. Of course, even when printing is started, it may be canceled if it is acceptable to interrupt printing in a state in which printing has been performed halfway through the printing medium.

Either way, the processor 10 determines whether or not the currently executing job can be canceled based on the type of job and the timing. In step S520, if it is not determined that the cancellation of the job being executed is possible, the processor 10 informs the user about the invalid operation (step S530).

On the other hand, in step S520, if it is determined that the cancellation of the job being executed is possible, the processor 10 cancels the job (step S525). That is, the processor 10 outputs the control signals to the mechanism, in which the first process is being executed, and causes the mechanism to interrupt the first process. For example, in a case where a copying is being performed, if a cancellation is instructed before the printing data is transferred, the processor 10 does not transfer the printing data to the printing unit 50.

When the job is canceled, the processor 10 causes the first processing mechanism, in which the first process is being executed, to perform a termination process and then stops supplying the electric power (step S540). That is, the processor 10 sets the multifunction machine 1 to the power saving state again, and repeats the process after step S100. Here, the termination process is a process required for shifting a state to a power saving state such as a process of discharging a printing medium being transported.

(3) Operation Example

According to the above process, the user can use the multifunction machine 1 even in a state, in which electric power is not supplied to the display device 30 and information by the display panel is not performed. For example, it is assumed that a monochrome copy is assigned to the numeral 1 and a color copy is assigned to the numeral 2 as default first processes. In this case, when the user mounts a document on the document table in the power saving state and the numeral key 1 and the # key are pressed in order, the monochrome copy is executed.

That is, when the numeral key 1 is pressed, the processor 10 starts the default selection mode through steps S100, S105, S130, S135, and S140. In the default selection mode, the numeral 1 is replaced to the default processing specification variable in step S200. In step S205, the # key is received, and the processor 10 executes step S230 through steps S210 and S220. Since the monochrome copy is assigned to the numeral 1 by default, the processor 10 determines that it is a valid number in step S230, and executes the monochrome copy in step S240 through step S235. Thereafter, the monochrome copy is completed and the power saving state is set again unless the C key is pressed by the user. Therefore, the user can execute the monochrome copy with extremely simple inputs.

Next, it is assumed that a high quality monochrome copy is assigned to the numeral 11 and a high quality color copy is assigned to the numeral 12 as favorite first processes. In this case, in the power saving state, if the user mounts a document on the document table and the # key, the numeral key 1, the numeral key 2, the * key, the numeral key 1, the numeral key 0, and the # key are pressed in order, then 10 copies of the high quality color copies are obtained.

That is, when the # key is pressed, the processor 10 starts the favorite selection mode through steps S100, S105, S130, and S135. In the favorite selection mode, the numeral key 1 is received in step S300, and the numeral 1 is replaced to the favorite processing specification variable. Next, the processor 10 executes step S300 again through steps S310 and S315, so that the numeral key 2 is received. As a result, the numeral 12 is replaced to the favorite processing specification variable.

When the processor 10 receives the * key in step S300, processor 10 executes step S330 through steps S305 and S320. Since the high quality color copy is assigned to the numeral 12 as a favorite process, the processor 10 determines that it is a valid number in step S330. Then, the processor 10 goes through steps S335 and S345 and starts the input mode for a number of copies to be printed in S350.

In the input mode for a number of copies to be printed, the numeral key 1 is received in step S400 and the numeral 1 is replaced to the number of copies variable. Next, the processor 10 executes step S400 again through steps S410 and S415, so that the numeral key 0 is received. As a result, the numeral 10 is replaced to the number of copies variable. Thereafter, when the processor 10 executes step S400 again, the # key is received. In this case, the processor 10 executes step S435 through steps S405 and S425.

Since the high quality color copy is assigned to the numeral 12 in the favorite selection mode, the processor 10 prints ten copies with the high quality color copy unless the C key is pressed by the user. Therefore, the user can execute the monochrome copy with extremely simple inputs. Further, according to the above configuration, while performing the specification of the first process and the specification of the number of copies to be printed by using the values, the first process can be executed according to a rule of inputting the intention of the user by using # or * between the specification. Also, when the user makes a mistake for the operation or forgets the input content during the operation, it is possible to easily re-enter using the C key. Therefore, even if the image information by the display device 30 is not performed, the process can be easily executed in accordance with the intention of the user.

(4) Other Embodiments

The above embodiment is an example for implementing the invention, and various other embodiments can be adopted. For example, the display system may be incorporated into equipment other than the multifunction machine, or it may be incorporated in a general-purpose computer such as a tablet terminal or a smart phone terminal. Furthermore, as in the above-described embodiment, the method, which make it possible to execute various processes by operating the physical keys in the power saving state, can be realized as invention of a program, invention of a method, and invention of a photographic data generation method. In particular, many modifications are possible as to what kind of key is provided where, which key to operate, how to operate the key, and which process should be performed.

Also, the functions described in the claims are realized by hardware resources in which functions are specified by the configuration itself, hardware resources in which functions are specified by programs, or a combination thereof. In addition, the functions of these units are not limited to those realized by hardware resources that are physically independent of each other. Further, the above-described embodiment is merely an example, and an embodiment in which a part of the configuration is omitted, another configuration is added or replaced, or the like may be adopted.

The display system may have a normal state in which electric power is supplied to the display device and a power saving state in which the electric power is not supplied to the display device, and the display system may be provided in various apparatus other than the printer as in the embodiment described above. For example, it may be provided in a scanner, or may be provided in a multifunction machine having a printer and other functions (scanner or the like). Further, it may be provided in another electronic device such as a projector or a paper-making machine.

The normal state may be any state in which the electric power is supplied to the display device. In other words, in the normal state, the display device may be in a state capable of performing display at any time when the electric power is supplied. In the electric conduction state, the electric power may be supplied to at least the display device, and the electric power may or may not be supplied to other mechanisms.

The power saving state is a state in which electric power is not supplied to the display device. Therefore, although any image cannot be displayed on the display device, the electric power for displaying is not supplied to the display device, so that the electric power consumption for display on the display device does not occur. In the power saving state, the electric power may not be supplied to at least the display device, and the electric power may or may not be supplied to other mechanisms.

The first key may be a physical key. That is, as for the first key, the input is performed by operating the movable portion with a finger or the like of the user, instead of an input mode in which the input is performed using an image displayed on a display device or the like or a gesture for a sensor. The shape, size, type, number, or the like of the key are not limited to the above-described embodiments, and various keys may be adopted. For example, the first key may be configured with a cross key, an OK button, a cancel button, or the like. In addition, the first key may be configured with a key other than the button, for example, a jog dial, a slider, or the like.

Furthermore, it is also possible to execute the first process corresponding to the first key by pressing the first key once. In this case, it is desirable to perform the first process corresponding to the first key with a long press for a predetermined time or more, in view of the possibility of erroneously pressing the first key.

Also, during the power saving, a dedicated physical key that restores a state from the power saving state by pressing the key may be provided separately from the second key in a shape or position that is more difficult to operate than the first key. In a case of a user who is not familiar with the operation method such as a beginner, it becomes easy to use since it is possible to shift a state to normal state just by pressing, and to perform an operation while watching the display of the display device. Further, a power key may also serve as the second key, and in the power saving state, when the power key is pressed for a short time, a state is shifted to the normal state, and when the power key is pressed for a long time, the power may be turned off.

Also, in order to make it easy for the user, who is not familiar with the operation method such as a beginner, to know which first process is performed by operating which first key, it is desirable to attach characters or marks indicating the first processes corresponding to the first keys at the first keys themselves or near the first keys. For example, by attaching the character string "monochrome copy" to the lower side of the numeral key 1 in FIG. 2, it is possible for the user to grasp that the monochrome copy can be performed by pressing the numeral key 1 during the power saving.

The processor may be any devices capable of executing various kinds of processes, and may be configured with a single chip or configured with plural chips. Further, the processor is not limited to a configuration including a CPU, a RAM, a ROM, or the like as in the above-described embodiment. For example, instead of a CPU, an ASIC may be used, or a CPU and an ASIC may be cooperated.

The processor may cause the first processing mechanism to execute the first process in a state in which electric power is not supplied to the display device when the first key is operated in the power saving state. That is, the processor may cause the first processing mechanism to execute the first process instructed by the first key without causing the display device to display the input interface.

Note that, in a case where the first key is operated, the electric power may not be supplied at least to the display device, and a state may be the power saving state or may be different from the power saving state. For example, even when the electric power supply to the first processing mechanism is stopped in the power saving state, the electric power is supplied to the first processing mechanism by operating the first key, so that it is no longer in the power saving state, however, even in this state, the electric power is not supplied to the display device. Note that, if the display device is the only target in which the electric power supply is stopped in the power saving state, the electric power is supplied to the first processing mechanism in a state where the power saving state is maintained when the first key is operated, and the first process is performed.

The first process may be a process determined in advance as a process corresponding to the operation with respect to the first key in the power saving state. Therefore, if the display system is provided in the multifunction machine as in the above-described embodiment, various types of printing, scanning, and processing related to the multifunction machine can be the first process. The invention is not limited to these examples, and if the display system is provided in other electronic device, a process in the other electronic device may be the first process. For example, if the display system is provided in the paper-making machine, various processes related to paper-making may be the first process.

Although the example in which the first process is the copying process by the printing unit 50 and the reading unit 60 functioning as the first processing mechanism has been described, the process may be other process, or the other process and the copying process may be included in the first process. The other process may be, for example, a maintenance process (ink tank replacement process, or the like) or a trouble elimination process (paper jam elimination process, or the like) in the printing unit 50 and the reading unit 60.

The first processing mechanism may be a mechanism for executing the first process, and is not limited to the printing unit and the reading unit as in the above-described embodiment. For example, one of the printing unit and the reading unit may be the first processing mechanism, or the paper-making unit may be the first processing mechanism if the display system is provided in the paper-making machine.

As for the configuration for supplying and stopping the electric power, various configurations other than the configuration for stopping the output of the electric power to the supply destination as in the above-described embodiment can be adopted. For example, upon stopping the electric power supply to the display device, in a case where a configuration for converting a voltage of a commercial power supply into a voltage for driving the display device is adopted by the power supply circuit, the electric power supply to the display device may be stopped, or the like by stopping the circuit of a portion performing the conversion.

The second process may be a process determined in advance as a process corresponding to the operation with respect to the first key in the normal state, and may be different from the first process. That is, a correspondence relationship between the first key and the process may be different in the first process and the second process. In the normal state and the power saving state, the same kind of process (for example, monochrome copy) can be activated by the first key, however, a configuration in which the operation method of the first key is different between the normal state and the power saving state may be adopted. The second processing mechanism may be able to execute the second process, and may or may not be a same mechanism as the first processing mechanism (however, processing contents may be different).

In the power saving state, when an instruction such as execution of a printing process is received from an external computer via a network, similar to the case when the first key is operated, the instructed process may be performed without supplying the electric power to the display device and when the process is completed, it may return to the power saving state without supplying the electric power to the display device.

The entire disclosure of Japanese Patent Application No. 2018-032911, filed Feb. 27, 2018 is incorporated by reference herein.

What is claimed is:

1. A display system having a normal state, in which electric power is supplied to a display device, and a power saving state, in which the electric power is not supplied to the display device, the system comprising:
   a first key that is a physical key; and
   a processor that causes a first processing mechanism to execute a first process in a state in which the electric power is not supplied to the display device, when the first key is operated in the power saving state,
   wherein the processor does not cause the electric power to be supplied to the display device until the first process is terminated when the first key is operated in the power saving state, and causes a state of the display device to be set to the power saving state without causing the electric power to be supplied to the display device, when the first process is terminated.

2. A display system having a normal state, in which electric power is supplied to a display device, and a power saving state, in which the electric power is not supplied to the display device, the system comprising:
   a first key that is a physical key; and
   a processor that causes a first processing mechanism to execute a first process in a state in which the electric power is not supplied to the display device, when the first key is operated in the power saving state,
   wherein the electric power is supplied to the first processing mechanism in the normal state and the electric power is not supplied to the first processing mechanism in the power saving state, and
   wherein, when the first key is operated in the power saving state, the processor causes the electric power to be supplied to the first processing mechanism, causes the first processing mechanism to execute the first process, and causes the electric power not to be supplied in response to a completion of the first process.

3. A display system having a normal state, in which electric power is supplied to a display device, and a power saving state, in which the electric power is not supplied to the display device, the system comprising:
   a first key that is a physical key; and
   a processor that causes a first processing mechanism to execute a first process in a state in which the electric power is not supplied to the display device, when the first key is operated in the power saving state,
   wherein the processor causes a second processing mechanism to execute a second process different from the first process when the first key is operated in the normal state.

4. The display system according to claim 3,
   wherein a mark indicating the first process is written in the first key.

* * * * *